(12) United States Patent
Kweon et al.

(10) Patent No.: US 12,156,175 B2
(45) Date of Patent: Nov. 26, 2024

(54) PAGING METHOD AND DEVICE IN WIRELESS COMMUNICATION SYSTEM

(71) Applicant: Samsung Electronics Co., Ltd., Suwon-si (KR)

(72) Inventors: Kisuk Kweon, Suwon-si (KR); Sangjun Moon, Suwon-si (KR); Youngkyo Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 381 days.

(21) Appl. No.: 17/774,331

(22) PCT Filed: Nov. 5, 2020

(86) PCT No.: PCT/KR2020/015439
§ 371 (c)(1),
(2) Date: May 4, 2022

(87) PCT Pub. No.: WO2021/091274
PCT Pub. Date: May 14, 2021

(65) Prior Publication Data
US 2022/0394668 A1  Dec. 8, 2022

(30) Foreign Application Priority Data
Nov. 7, 2019  (KR) .................. 10-2019-0141902

(51) Int. Cl.
*H04W 68/02* (2009.01)
*H04W 60/00* (2009.01)
(Continued)

(52) U.S. Cl.
CPC ........... *H04W 68/02* (2013.01); *H04W 60/00* (2013.01); *H04W 80/10* (2013.01); *H04W 84/042* (2013.01); *H04W 92/02* (2013.01)

(58) Field of Classification Search
CPC ..... H04W 68/02; H04W 60/00; H04W 80/10; H04W 84/42; H04W 92/02
(Continued)

(56) References Cited

U.S. PATENT DOCUMENTS

2014/0006158 A1* 1/2014 Cooper .................. G06Q 30/02
705/14.56
2019/0097952 A1* 3/2019 Yong ..................... H04W 28/18
(Continued)

FOREIGN PATENT DOCUMENTS

WO  2018/155934 A1  8/2018
WO  2018/175000 A1  9/2018

OTHER PUBLICATIONS

3rd Generation Partnership Project; Technical Specification Group Services and System Aspects; System Architecture for the 5G System (5GS); Stage 2 (Release 16), 3GPP TS 23.501 V16.2.0, Sep. 24, 2019, Sophia Antipolis, France.
(Continued)

*Primary Examiner* — Nghi H Ly
(74) *Attorney, Agent, or Firm* — Jefferson IP Law, LLP (57) ABSTRACT

Provided is a communication method performed by a user equipment (UE) to receive a paging message, the communication method including registering to a stand-alone non-public network (SNPN), transmitting, to a session management function (SMF) of the SNPN or an access and mobility management function (AMF) of the SNPN, a protocol data unit (PDU) session establishment request message for requesting subscription to a notification service for receiving a paging message of a public land mobile network (PLMN), registering to the PLMN through the SNPN and a non-3GPP inter-working function (N3IWF) of the PLMN, in a case where a paging event occurs when the UE is in an idle state in the PLMN, receiving the paging message from the AMF of the SNPN having received a notification message based
(Continued)

on the notification service, and performing a service request procedure based on the paging message.

15 Claims, 6 Drawing Sheets

(51) Int. Cl.
  *H04W 80/10* (2009.01)
  *H04W 84/04* (2009.01)
  *H04W 92/02* (2009.01)
(58) Field of Classification Search
  USPC .................. 455/458, 422.1, 435.1, 574, 418
  See application file for complete search history.

(56) References Cited

U.S. PATENT DOCUMENTS

| | | | |
|---|---|---|---|
| 2019/0261249 A1 | 8/2019 | Xiong et al. | |
| 2019/0394711 A1 | 12/2019 | Kim | |
| 2022/0240147 A1* | 7/2022 | Wolfner | H04W 36/0022 |
| 2022/0369219 A1* | 11/2022 | Landais | H04L 5/0046 |

OTHER PUBLICATIONS

3rd Generation Partnership Project; Technical Specification Group Services and System Aspects; Study on enhancement of 5G System (5GS) for vertical and Local Area Network (LAN) services (Release 16), 3GPP TR 23.734 V16.2.0, Jun. 11, 2019, Sophia Antipolis, France.
3rd Generation Partnership Project; Technical Specification Group Services and System Aspects; Procedures for the 5G System (5GS); Stage 2 (Release 16), 3GPP TS 23.502 V16.2.0, Sep. 24, 2019, Sophia Antipolis, France.
3GPP; TSG CT; Non-Access-Stratum (NAS) protocol for 5G System (5GS); Stage 3, 3GPP TS 24.501 V16.2.0, Sep. 24, 2019.
International Search Report dated Feb. 9, 2021, issued in International Application No. PCT/KR2020/015439.
3rd Generation Partnership Project; Technical Specification Group Services and System Aspects; Study on enhanced support of non-public networks (Release 17), 3GPP TR 23.700-07 V1.1.0, Oct. 30, 2020, XP051961588.
European Search Report dated Nov. 10, 2022, issued in European Application No. 20884765.7.
European Notice of Allowance dated Jan. 26, 2024, issued in European Patent Application No. 20884765.7.
Chinese Notice of Allowance dated Feb. 29, 2024, issued in Chinese Patent Application No. 202080086776.3.

* cited by examiner

PAGING METHOD AND DEVICE IN WIRELESS COMMUNICATION SYSTEM

TECHNICAL FIELD

The present disclosure relates to a communication system, and more particularly, to a method for paging.

BACKGROUND ART

To meet demand due to ever-increasing wireless data traffic after commercialization of the $4^{th}$ generation (4G) communication system, there have been efforts to develop an advanced $5^{th}$ generation (5G) system or pre-5G communication system. For this reason, the 5G or pre-5G communication system is also called a beyond 4G network communication system or post long term evolution (LTE) system.

Implementation of the 5G communication system using ultra-frequency millimeter wave (mmWave) bands, e.g., 60 GHz bands, is considered to achieve higher data rates. To reduce pathloss of radio waves and to increase a transmission range of radio waves in the ultra-frequency bands, beamforming, massive multiple-input multiple-output (MIMO), full dimensional MIMO (FD-MIMO), array antenna, analog beamforming, and large-scale antenna techniques are under discussion and applied to the NR system.

Also, to improve a network of the system, techniques, such as an advanced small cell, a cloud radio access network (cloud RAN), a ultra-dense network, device-to-device (D2D) communication, wireless backhaul, a moving network, cooperative communication, coordinated multi-points (CoMP), and reception interference cancellation, have been developed in the 5G communication system.

In addition, advanced coding modulation (ACM) schemes, namely, hybrid FSK and QAM modulation (FQAM) and sliding window superposition coding (SWSC), and advanced access techniques, namely, a filter bank multicarrier (FBMC), a non-orthogonal multiple access (NOMA), and a sparse coding multiple access (SCMA), have been developed, in the 5G communication system.

A $5^{th}$ generation (5G) system considers supporting various services, compared to an existing $4^{th}$ generation (4G) system. Examples of representative services may include enhanced mobile broadband (eMBB), ultra-reliable and low latency communications (URLLC), massive machine type communications (mMTC), and evolved multimedia broadcast/multicast service (eMBMS). Also, a system providing the URLLC service may be referred to as a URLLC system, and a system providing the eMBB service may be referred to as an eMBB system. Also, the terms "service" and "system" may be interchangeably used.

The URLLC service from among the services described above is newly considered in the 5G system beyond the previous 4G system, and in contrast to other services, requires satisfaction of conditions, such as ultra-high reliability (for example, a packet error rate being equal to or smaller than about $10^{-5}$) and low latency (for example, about 0.5 msec). In order to satisfy this strict requirement, a shorter transmission time interval (TTI) may have to be applied to the URLLC service than the eMBB service, and various operating schemes applying the shorter TTI have been considered.

In the meantime, the Internet is evolving from a human-centered connectivity network where humans generate and consume information to an Internet of Things (IoT) network where distributed entities or things send, receive and process information. Internet of everything (IoE) technologies in which big data processing technologies, etc. based on connection with a cloud server, etc. are combined with the IoT technologies have also emerged. To implement the IoT, technological elements, such as a sensing technology, a wired/wireless communication and network infrastructure, a service interface technology, and a security technology, are required, and thus, recently, techniques for connection between things, such as a sensor network, machine-to-machine (M2M) communication, machine-type communication (MTC), etc., have been studied.

In an IoT environment, intelligent Internet technology (IT) services that create new values in human life by collecting and analyzing data generated among connected things, may be provided. IoT may be applied to a variety of areas, such as smart homes, smart buildings, smart cities, smart cars or connected cars, smart grid, health care, smart home appliances and advanced medical services through convergence and combination between existing Information Technologies (IT) and various industrial applications.

Thus, various attempts have been made to apply the 5G communication system to an IoT network. For example, techniques, such as a sensor network, M2M communication, MTC, etc., are implemented based on 5G communication techniques, such as beamforming, MIMO, an array antenna, etc. As described above, that the cloud RAN may be applied as the big data processing technology may also be regarded as an example of the convergence between the 5G technology and the IoT technology.

With the developments in technology described above and a mobile communication system, it has become possible to provide various services, and thus, a method for efficiently using a non-public network (NPN) is required.

DESCRIPTION OF EMBODIMENTS

Technical Problem

Described embodiments are to provide methods and apparatuses for effectively providing services in a wireless communication system.

Solution to Problem

Described embodiments may provide apparatuses and methods for effectively providing services in a wireless communication system.

Advantageous Effects of Disclosure

Described embodiments provide apparatuses and methods for effectively providing services in a wireless communication system.

BEST MODE

According to an embodiment of the disclosure, a communication method performed by a user equipment (UE) to receive a paging message includes registering to a stand-alone non-public network (SNPN), transmitting, to a session management function (SMF) of the SNPN or an access and mobility management function (AMF) of the SNPN, a protocol data unit (PDU) session establishment request message for requesting subscription to a notification service for receiving a paging message of a public land mobile network (PLMN), registering to the PLMN through the SNPN and a non-3GPP inter-working function (N3IWF) of the PLMN, in a case where a paging event occurs when the UE is in an idle state in the PLMN, receiving the paging message from the AMF of the SNPN having received a notification message based on the notification service, and performing a service request procedure based on the paging message.

The performing of the service request procedure may include receiving a service accept message including an identification (ID) of the PLMN.

The PDU session establishment request message may include an identification (ID) of the PLMN, to which the UE is to register, and a generic public subscription identifier (GPSI) assigned from the PLMN.

The method may further include, through a PDU session modification procedure, requesting subscription to the notification service from the SMF of the SNPN or the AMF of the SNPN.

The notification service for receiving the paging message may include a paging event notification service or a downlink notification (DN) event notification service.

According to an embodiment of the disclosure, a communication method performed by an entity in a stand-alone non-public network (SNPN) to receive a paging message includes receiving, from a user equipment (UE), a protocol data unit (PDU) session establishment request message for requesting subscription to a notification service for receiving a paging message of a public land mobile network (PLMN), subscribing to the notification service for receiving the paging message of an access and mobility management function (AMF) of the PLMN, when the UE is in an idle state in the PLMN, receiving, from the AMF of the PLMN, a notification message based on the notification service, through a network exposure function (NEF) of the PLMN, transmitting, to the UE, the paging message, based on the notification message, and performing a service request procedure with the UE.

The performing of the service request procedure may include transmitting a service accept message including an identification (ID) of the PLMN.

The PDU session establishment request message may include an identification (ID) of the PLMN, to which the UE is to register, and a generic public subscription identifier (GPSI) assigned from the PLMN.

The subscribing to the notification service for receiving the paging message of the AMF of the PLMN, when the UE is in the idle state in the PLMN, may include subscribing to the notification service for receiving the paging message of the AMF of the PLMN, through an NEF of the SNPN and the NEF of the PLMN, or subscribing to the notification service for receiving the paging message of the AMF of the PLMN, through the NEF of the SNPN, an application function (AF) of the SNPN, and the NEF of the PLMN.

The entity may be an AMF of the SNPN or a session management function (SMF) of the SNPN, and the notification service for receiving the paging message may include a paging event notification service or a downlink notification (DN) event notification service.

According to an embodiment of the disclosure, a user equipment (UE) configured to receive a paging message includes a transceiver and a processor coupled to the transceiver and configured to register to a stand-alone non-public network (SNPN), transmit, to a session management function (SMF) of the SNPN or an access and mobility management function (AMF) of the SNPN, a protocol data unit (PDU) session establishment request message for requesting subscription to a notification service for receiving a paging message of a public land mobile network (PLMN), register to the PLMN through the SNPN and a non-3GPP inter-working function (N3IWF) of the PLMN, in a case where a paging event occurs when the UE is in an idle state in the PLMN, receive the paging message from the AMF of the SNPN having received a notification message based on the notification service, and perform a service request procedure based on the paging message.

The processor may further be configured to receive a service accept message including an identification (ID) of the PLMN.

The PDU session establishment request message may include an identification (ID) of the PLMN, to which the UE is to register, and a generic public subscription identifier (GPSI) assigned from the PLMN.

The processor may further be configured to request, through a PDU session modification procedure, the SMF of the SNPN or the AMF of the SNPN to subscribe to the notification service.

The notification service for receiving the paging message may include a paging event notification service or a downlink notification (DN) event notification service.

According to an embodiment of the disclosure, an entity in a stand-alone non-public network (SNPN), the entity being configured to receive a paging message, includes a transceiver and a processor coupled to the transceiver and configured to receive, from a user equipment (UE), a protocol data unit (PDU) session establishment request message for requesting subscription to a notification service for receiving a paging message of a public land mobile network (PLMN), register to the notification service for receiving the paging message of an access and mobility management function (AMF) of the PLMN, when the UE is in an idle state in the PLMN, receive, from the AMF of the PLMN, a notification message based on the notification service, through a network exposure function (NEF) of the PLMN, transmit, to the UE, the paging message based on the notification message, and perform a service request procedure with the UE.

The processor may further be configured to transmit a service accept message including an identification (ID) of the PLMN.

The PDU session establishment request message may include an identification (ID) of the PLMN, to which the UE is to register, and a generic public subscription identifier (GPSI) assigned from the PLMN.

The processor may further be configured to subscribe to the notification service for receiving the paging message of the AMF of the PLMN, through an NEF of the SNPN and the NEF of the PLMN, or subscribe to the notification service for receiving the paging message of the AMF of the PLMN, through the NEF of the SNPN, an application function (AF) of the SNPN, and the NEF of the PLMN.

The entity may be an AMF of the SNPN or a session management function (SMF) of the SNPN, and the notification service for receiving the paging message may include a paging event notification service or a downlink notification (DN) event notification service.

MODE OF DISCLOSURE

Hereinafter, exemplary embodiments of the disclosure will be described in detail with reference to accompanying drawings. In the accompanying drawings, it will be understood that like reference numerals denote like elements. Also, detailed descriptions of well-known functions and configurations in the art are omitted when it is deemed that they may unnecessarily obscure the essence of the disclosure.

In the following descriptions of embodiments in the specification, descriptions of techniques that are well known in the art and are not directly related to the disclosure are omitted. This is to clearly convey the gist of the disclosure by omitting unnecessary descriptions.

For the same reasons, components may be exaggerated, omitted, or schematically illustrated in drawings for clarity. The size of the respective elements may not fully reflect their actual size. In each drawing, elements that are the same or are in correspondence are rendered the same reference numeral.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. Like numbers refer to like elements throughout the specification.

Here, it will be understood that combinations of blocks in flowcharts or process flow diagrams may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-executable or computer-readable memories oriented for computers or other programmable data processing equipment, so it is possible to manufacture a product that contains instructions for performing functions described in the block(s) of the flowchart. The computer program instructions may also be loaded on computers or other programmable data processing equipment, so it is possible for the instructions to generate a process executed on the computer or the other programmable data processing equipment to provide steps for performing functions described in the block(s) of the flowchart.

Furthermore, each block may represent a module, segment, or a part of code including one or more executable instructions to perform particular logic function(s). It should also be noted that the functions described in the blocks may occur out of order in alternate embodiments of the disclosure. For example, two blocks shown in succession may in fact be executed substantially concurrently or the blocks may sometimes be executed in the reverse order, depending upon the functionality involved.

Furthermore, the term "unit" or "module" as herein used refers to a software or hardware component, such as field programmable gate array (FPGA) or application specific integrated circuit (ASIC) which performs a certain role. However, the "unit" is not limited to the software or hardware. The "unit" may be configured to be stored in an addressable storage medium, or to operate one or more processors. For example, the "unit" may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and "units" may be combined into a less number of components and the "units" or further divided into a more number of components and "units." Moreover, the components and the "units" may be implemented to execute one or more central processing units (CPUs) in a device or security multimedia card.

Hereinafter, a base station is an entity configured to allocate a resource for a terminal and may be at least one of a Node B, a BS, an eNode B (eNB), a gNode B (gNB), a radio access unit, a base station controller, or a node on a network. Examples of a terminal may include a user equipment (UE), a mobile station (MS), a cellular phone, a smartphone, a computer, and a multimedia system capable of performing a communication function. Also, embodiments of the disclosure may also be applied to other communication systems having similar technical backgrounds or channel types as those of the embodiments of the disclosure described hereinafter. Also, embodiments of the disclosure are applicable to other communication systems through modification at the discretion of one of ordinary skill in the art without greatly departing from the scope of the disclosure.

In the following description, terms for identifying access nodes, terms referring to network entities or network functions (NF), terms referring to messages, terms referring to interfaces between network entities, terms referring to various identification information, and the like are used for convenience of description. Accordingly, the disclosure is not limited to terms to be described below, and other terms indicating objects having equal technical meanings may be used.

Hereinafter, for convenience of description, some of terms and names defined by the 3$^{rd}$ Generation Partnership Project Long Term Evolution (3GPP LTE) standard may be used. However, the disclosure is not limited to these terms and names, and may be equally applied to wireless communication systems conforming to other standards.

Embodiments of the disclosure provide methods of transmitting paging occurring in a public land mobile network (PLMN) to a UE (or a user) through a stand-alone non-public network (SNPN), when the user uses a PLMN service by using the SNPN.

Also, the embodiments hereinafter describe a case where a UE accessing an SNPN to receive a PLMN service receives the PLMN service through the SNPN. The UE may register to each of the SNPN and the PLMN and may generate a PDU session in order to receive a service from the PLMN. When a state of the UE receiving the PLMN service becomes connection management-idle (CM-IDLE) in the PLMN, and downlink (DL) data occurs for the UE, a paging message may have to be transmitted to the UE to report this situation to the UE. However, when the UE receives a PLMN service through a non-3GPP access of a network that is different from the PLMN, there is no way to report the occurrence of DL data to the UE. Thus, hereinafter, a method of reporting the occurrence of DL data to a UE accessing a PLMN through an SNPN is provided.

Figure 1:
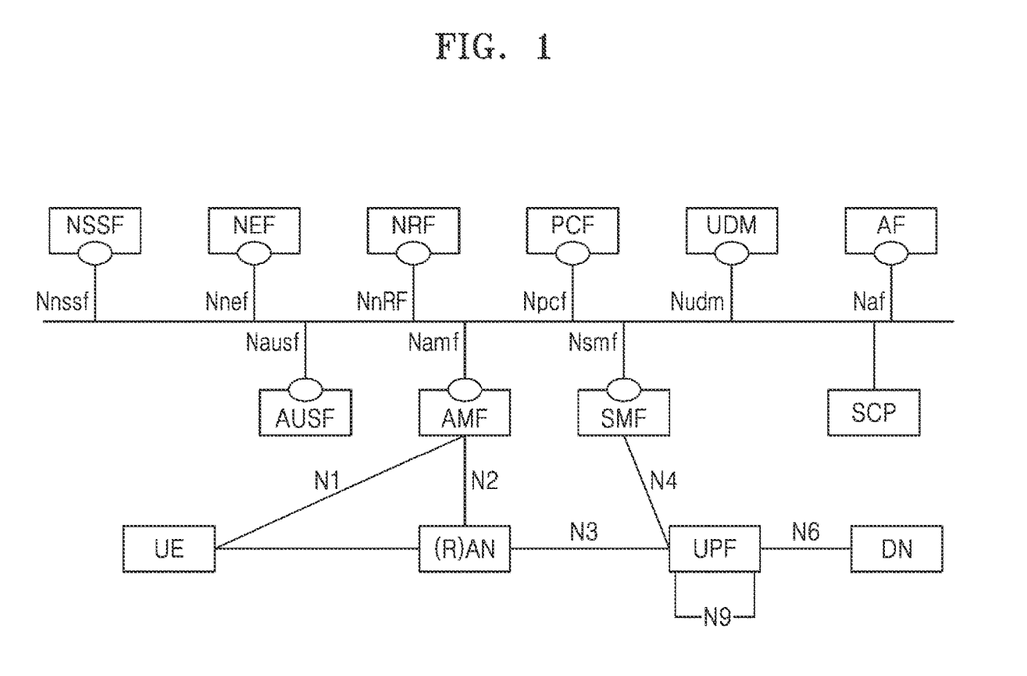
FIG. 1 illustrates a structure of a $5^{th}$ generation (5G) network according to an embodiment of the disclosure.

FIG. 1 illustrates a structure of a $5^{th}$ generation (5G) network according to an embodiment of the disclosure. Network entities or network nodes included in the 5G network are described as below.

A (radio) access network ((R)AN) is an entity configured to perform wireless resource assignment for a terminal and may be at least one of an eNode B, a Node B, a BS, a next-generation (NG) RAN, a radio access unit, a base station controller, or a node on a network. Examples of a terminal may include a UE, an NG UE, an MS, a cellular phone, a smartphone, a computer, and a multimedia system capable of performing a communication function. Also, embodiments of the disclosure are described with the example of a 5G system, hereinafter. However, the embodiments of the disclosure may be applied to other communication systems having similar technical backgrounds. In addition, the embodiments of the disclosure may be applied to other communication systems by including some modifications that are made within a range not to significantly deviate from the scope of the disclosure based on the determination of one of ordinary skill in the art.

As a wireless communication system has evolved from a $4^{th}$ generation (4G) system to a 5G system, a new core network, that is, an NG core or a 5G core (5GC) has been defined. The new core network has virtualized all previous network entities (NEs) to network functions (NFs). According to an embodiment of the disclosure, an NF may denote a network entity, a network component, or a network resource.

According to an embodiment of the disclosure, the 5GC may include NFs illustrated in FIG. 1. However, it is not limited to the examples of FIG. 1. The 5GC may include more or less NFs than the NFs illustrated in FIG. 1.

According to an embodiment of the disclosure, an access and mobility management function (AMF) may be an NF configured to manage mobility of a UE.

According to an embodiment of the disclosure, a session management function (SMF) may be an NF configured to manage packet data network (PDN) connection provided to a UE. The PDN connection may be referred to as a protocol data unit (PDU) session.

According to an embodiment of the disclosure, a policy control function (PCF) may be an NF configured to implement a service policy, a charge policy, and a PDU session policy of a mobile communication operator with respect to a UE.

According to an embodiment of the disclosure, unified data management (UDM) may be an NF configured to store information about a subscriber.

According to an embodiment of the disclosure, a network exposure function (NEF) may be a function configured to provide information about a UE to a server outside a 5G network. Also, the NEF may be provide a function of providing the 5G network with information required for a service and storing the information in a unified data repository (UDR).

According to an embodiment of the disclosure, a user plane function (UPF) may be a function configured to serve as a gateway for transmitting user data (a PDU) to a data network (DN).

According to an embodiment of the disclosure, a network repository function (NRF) may perform a function of discovering an NF.

According to an embodiment of the disclosure, an authentication server function (AUSF) may perform UE authentication in a 3GPP access network and a non-3GPP access network.

According to an embodiment of the disclosure, a network slice selection function (NSSF) may perform a function of selecting a network slice instance provided to a UE. A DN may be a data network through which a UE transceives data to use a service of a network operator or a service of a $3^{rd}$ party.

Figure 2:
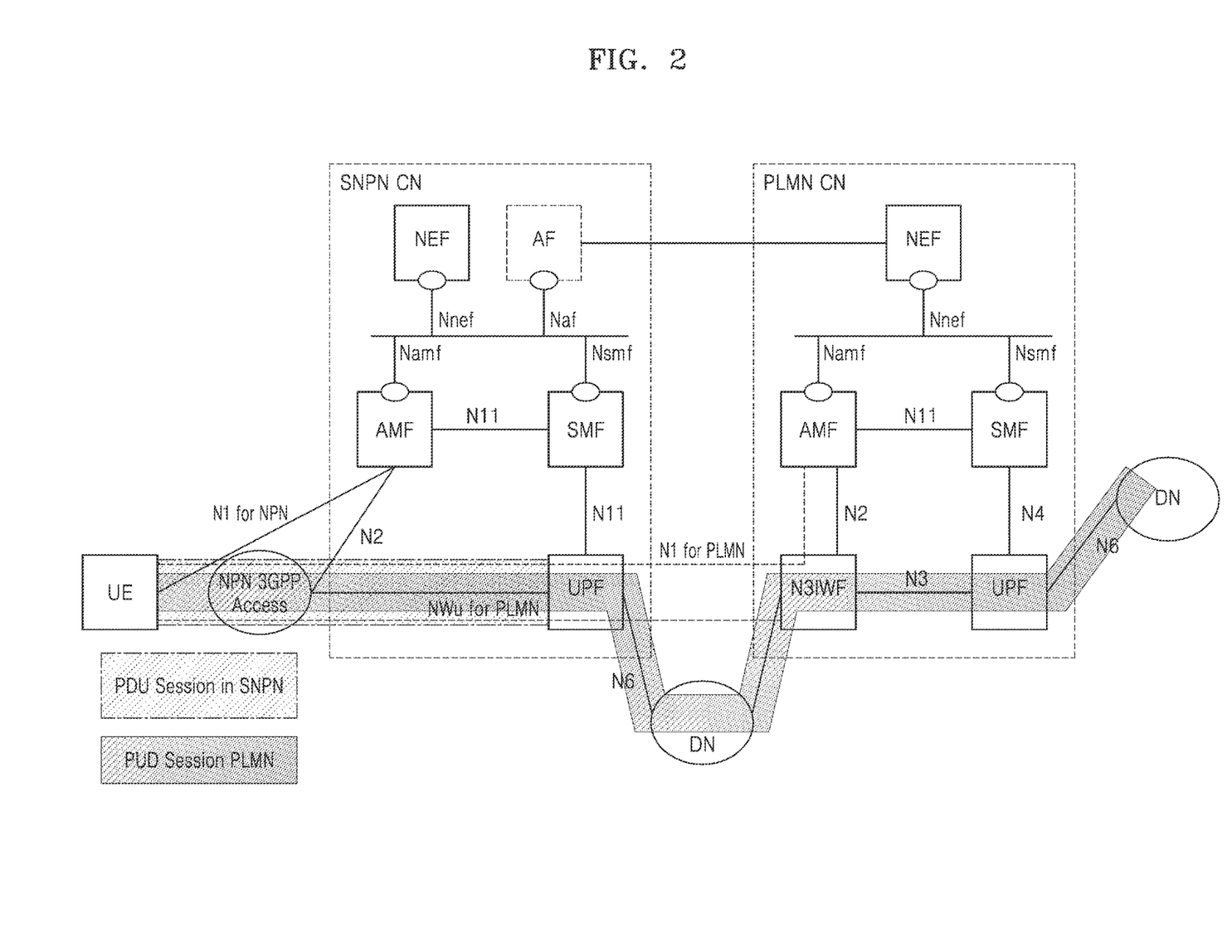
FIG. 2 illustrates a relationship between a stand-alone non-public network (SNPN) and a public land mobile network (PLMN) when a terminal uses a PLMN service through the SNPN, according to an embodiment of the disclosure.

FIG. 2 shows a relationship between an SNPN and a PLMN when a UE uses a PLMN service through the SNPN, according to an embodiment of the disclosure.

In a 5G communication system, a non-public network (NPN) which enables communication within the network without connection with an external network is prosed. The NPN is used only for the purpose of services within an internal network without external connection, as in a factory, a company, a sports stadium, a concert hall, etc. The NPN may also be called a private network.

According to an embodiment of the disclosure, the NPN may be divided into an SNPN and a public network integrated NPN (PNPN) according to a use thereof. In the case of the SNPN, an operator may become an NPN operator, and no NF operated by a PLMN may be used. In contrast, in the case of the PNPN, the PLMN may become an operator, and at least one of the NFs provided by the PLMN may be used to construct the network. Also, the NPN may be constructed by using a network slicing technique.

According to an embodiment of the disclosure, the NPN may use a PLMN service according to a request of a user. That is, after a user accesses the NPN, the user may access, through the NPN, a PLMN to which the user is registered, and may receive a service. Here, the PLMN determine (or consider) that the user access the network thereof by using an unstructured non-3GPP access network.

In FIG. 2, the UE may register to the SNPN, and then, may generate a PDU session in the SNPN. Thereafter, the UE may access a non-3GPP interworking function (N3IWF) of the PLMN through a DN and may generate IPsec security association (SA) connection. The UE may register to the PLMN through the generated IPsec SA connection and may generate the PDU session to use a PLMN service.

Figure 3:
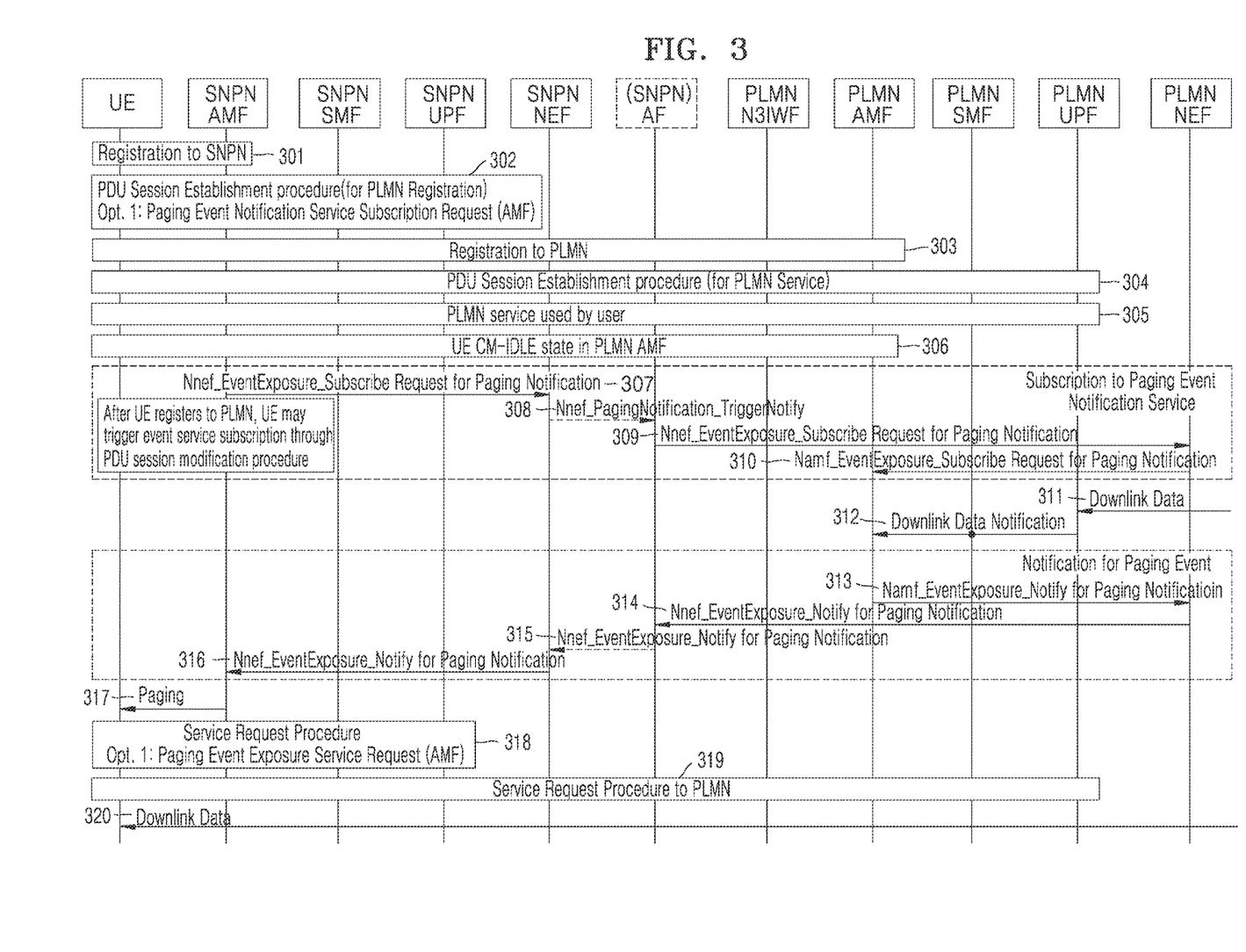
FIG. 3 illustrates a procedure in which a terminal establishes a PDU session to access a PLMN in an SNPN, according to an embodiment of the disclosure.

FIG. 3 illustrates a procedure in which a UE receives, in an SNPN, paging with respect to a PLMN service, based on a paging event notification service, according to an embodiment of the disclosure.

In operation 301, the UE may register to the SNPN in order to receive an SNPN service and the PLMN service.

In operation 302, the UE may register to the PLMN and may perform, in the SNPN, a procedure of establishing a PDU session, in order to use the PLMN service. Here, when the UE is to receive, in the SNPN, a paging message generated in the PLMN, the UE may request an SNPN AMF to subscribe to a paging event notification service of a PLMN AMF. To this end, when the UE transmits a PDU session establishment request message, the UE may transmit, to the SNPN AMF, a PLMN identification (ID) to register to and a generic public subscription identifier (GPSI) assigned by the corresponding PLMN. Additionally, when the UE did not request the paging event notification service in the PDU session establishment procedure and later is to request the corresponding service with respect to a corresponding PDU session, the UE may perform this operation through a PDU session modification procedure.

In operation 303, the UE may register to the PLMN through a generated PDU session, and in operation 304, the UE may generate a PDU session in the PLMN for a PLMN service. In operation 305, a user of the UE may use the PLMN service. In operation 306, when no more data occurs in the corresponding PDU session, or due to an IPsec tunneling issue between the UE and the PLMN N3IWF, the UE may be transitioned to a CM-IDLE state in the PLMN.

As described above, due to transition of the UE to the CM-IDLE state in the PLMN, a user plane (UP) of a PDU session of the SNPN may be deactivated. The SNPN AMF may detect that the UP of the PDU session of the SNPN is deactivated due to the transition of the UE to the CM-IDLE state and may subscribe to the paging event notification service of the PLMN AMF. Alternatively, after the UE registers to the PLMN, the UE may request subscription to the paging event notification service through the PDU session modification procedure. In detail, subscription to the paging event notification service may be performed through the operations below.

In operation 307, the SNPN AMF may transmit, to an SNPN NEF, a message requesting subscription to the paging event notification service, together with at least one of an AMF ID, a UE ID, a PDU session ID, a PLMN ID, or a GPSI (PLMN). Here, the PLMN ID and the GPSI may be information in the PLMN to which the UE is to register, the information being received from the UE. The UE ID may include a subscription permanent identifier (SUPI) or a 5G-globally unique temporary identifier (GUTI), but is not limited to this example. The UE ID may include all identifiers which may identify the UE.

In operations 308 and 309, the SNPN NEF receiving, from the SNPN AMF, the request of subscription to the paging event notification service of the PLMN, may identify the PLMN ID and may directly transmit the request to a corresponding PLMN NEF. Here, a parameter to be transmitted to be transmitted may include at least one of an SNPN ID, an NEF ID/address, a GPSI (SNPN), a PLMN ID, or a GPSI (PLMN). Additionally, when the SNPN NEF requests the subscription to the paging event notification service from the PLMN NEF, the request may be transmitted through an (SNPN) application function (AF). That is, the SNPN NEF may request the subscription to the paging event notification service from the PLMN NEF through the AF or may request the subscription to the paging event notification service from the PLMN NEF without using the medium of the AF.

In operation 310, the PLMN NEF receiving the request of subscription to the service may find a UE ID (PLMN) and a PLMN AMF to which the corresponding UE is registered, through UDM based on the UE GPSI (PLMN) and may request the service subscription from the corresponding PLMN AMF. Here, the PLMN NEF may transmit at least one of the SNPN ID or the UE ID (PLMN).

In operation 311, DL data for the UE may occur in the PLMN. In operation 312, a PLMN SMF may request paging from the PLMN AMF by reporting to the PLMN AMF that the DL data for the UE occurs.

In operation 313, because a paging event occurs with respect to the UE subscribed to the paging event notification, the PLMN AMF may transmit notification about the paging event to the PLMN NEF. Here, a parameter to be transmitted may include at least one of the SNPN ID or the UE ID.

In operations 314 and 315, the PLMN NEF receiving the notification may transmit, to the SNPN NEF, the notification reporting that the paging event occurs, directly or by using the (SNPN) AF. Here, a parameter to be transmitted may include at least one of the PLMN ID, the GPSI (PLMN), or the GPSI (SNPN). That is, the PLMN NEF may transmit, to the SNPN NEF, the notification reporting that the paging event occurs through the AF or may transmit, to the SNPN NEF, the notification reporting that the paging event occurs without using the AF.

In operation 316, the SNPN NEF may transmit, to the SNPN AMF, the notification reporting that the paging event occurs. Here, a parameter to be transmitted may include at least one of the UE ID (SNPN) or the PDU session ID.

In operation 317, the SNPN AMF receiving the notification may transmit a paging message to the corresponding UE.

In operation 318, the UE receiving the paging message may perform a service request procedure to receive data. Here, the SNPN AMF may request, from an SNPN SMF, activation of the UP of the PDU session in the SNPN generated to access the PLMN. Also, in order to report to the UE that the paging message is related to data occurrence in the PLMN rather than data reception in the SNPN, a service accept message may be transmitted to the UE by including the PLMN ID as a parameter.

In operation 319, the UE receiving the service accept message may perform the service request procedure with respect to the PLMN in order to receive data from the PLMN ID.

In operation 320, the UE may receive the data from the PLMN.

Figure 4:
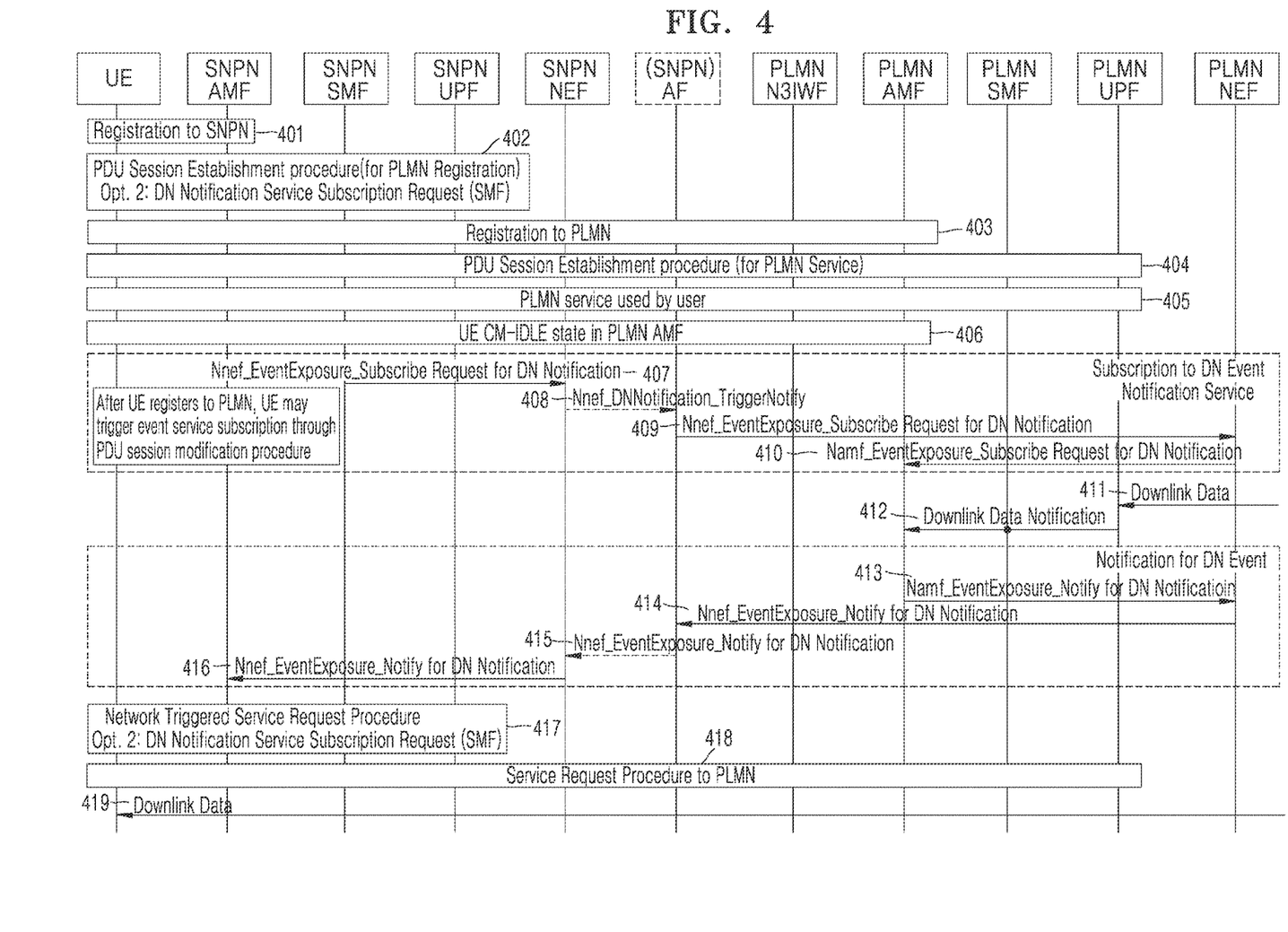
FIG. 4 illustrates a procedure in which a terminal registers to a PLMN, according to an embodiment of the disclosure.

FIG. 4 illustrates a procedure in which a UE receives, in an SNPN, paging with respect to a PLMN service, based on a downlink notification (DN) event notification service according to an embodiment of the disclosure.

The procedure of FIG. 4 may correspond to one or more components of the paging event notification service described with reference to FIG. 3.

In operation 401, a UE may register to the SNPN in order to receive an SNPN service and the PLMN service.

In operation 402, the UE may register to a PLMN and may perform, in the SNPN, a procedure of establishing a PDU session, in order to use the PLMN service. Here, when the UE attempts to receive, in the SNPN, a paging message generated in the PLMN, the UE may request an SNPN SMF to subscribe to a DN event notification service of a PLMN AMF. To this end, when the UE transmits a PDU session establishment request message, the UE may transmit, to the SNPN SMF, the PDU session establishment request message including a PLMN ID to register to and a GPSI assigned by the corresponding PLMN, so that the SMF may identify the PLMN ID to register to and the GPSI assigned by the corresponding PLMN. Additionally, when the UE did not request a paging event notification service in the PDU session establishment procedure and later is to request the corresponding service with respect to a corresponding PDU session, the UE may perform this operation through a PDU session modification procedure.

Operations 403 through 406 may correspond to operations 303 through 306 of FIG. 3 described above, and thus, their detailed descriptions are omitted.

As described above, due to transition of the UE to a CM-IDLE state in the PLMN, a UP of a PDU session of the SNPN may be deactivated. The SNPN SMF may detect that the UP of the PDU session of the SNPN is deactivated due to the transition of the UE to the CM-IDLE state and may subscribe to the DN event notification service of the PLMN AMF. Alternatively, after the UE registers to the PLMN, the UE may request subscription to the DN event notification service through the PDU session modification procedure. In detail, subscription to the DN event notification service may be performed through the operations below.

In operation 407, the SNPN SMF may transmit, to an SNPN NEF, a message requesting subscription to the DN event notification service, together with at least one of an SMF ID, a UE ID, a PDU session ID, a PLMN ID, or a GPSI (PLMN). Here, the PLMN ID and the GPSI may be information in the PLMN to which the UE is to register, the information being received from the UE. The UE ID may include a SUPI or a 5G-GUTI, but is not limited to this example. The UE ID may include all identifiers which may identify the UE.

In operations 408 and 409, the SNPN NEF receiving, from the SNPN SMF, the request of subscription to the DN event notification service of the PLMN, may identify the PLMN ID and may directly transmit the request to a corresponding PLMN NEF. Here, a parameter to be transmitted may include at least one of an SNPN ID, an NEF ID/address, a GPSI (SNPN), a PLMN ID, or a GPSI (PLMN). Additionally, when the SNPN NEF requests the subscription to the DN event notification service from the PLMN NEF, the request may be transmitted through an (SNPN) AF. That is, the SNPN NEF may request the subscription to the DN event notification service from the PLMN NEF through the AF or may request the subscription to the DN event notification service from the PLMN NEF without using the medium of the AF.

In operation 410, the PLMN NEF receiving the request of subscription to the service may search for a UE ID (PLMN) and a PLMN AMF to which the corresponding UE is registered, through UDM based on the UE GPSI (PLMN) and may request the service subscription from the corresponding PLMN AMF. Here, the PLMN NEF may transmit at least one of the SNPN ID or the UE ID (PLMN).

Operations 411 and 412 may correspond to operations 311 and 312 of FIG. 3 described above, and thus, their detailed descriptions are omitted.

In operation 413, because a DN event occurs with respect to the UE subscribed to the DN event notification, the PLMN AMF may transmit notification about the DN event to the PLMN NEF. Here, a parameter to be transmitted may include at least one of the SNPN ID or the UE ID.

In operations 414 and 415, the PLMN NEF receiving the notification may transmit, to the SNPN NEF, the notification reporting that the DN event occurs, directly or by using the (SNPN) AF. Here, a parameter to be transmitted may include at least one of the PLMN ID, the GPSI (PLMN), or the GPSI (SNPN). That is, the PLMN NEF may transmit, to the SNPN NEF, the notification reporting that the DN event occurs through the AF or may transmit, to the SNPN NEF, the notification reporting that the DN event occurs without using the AF.

In operation 416, the SNPN NEF may transmit, to the SNPN AMF, the corresponding notification. Here, at least one of the UE ID (SNPN) or the PDU session ID may be transmitted as a parameter.

In operation 417, the SNPN SMF receiving the notification may request paging for the corresponding UE from the SNPN AMF and may perform a network triggered service request procedure. Here, in order to report to the UE that the paging message is related to data occurrence in the PLMN rather than data reception in the SNPN, the SNPN SMF may transmit, to the SNPN AMF, an SM message by including the PLMN ID, so that the PLMN ID is transmitted to the UE through a service accept message.

In operation 418, the UE receiving the paging message may perform a service request procedure to receive data. The UE receiving the service accept message may perform the service request procedure with respect to the PLMN, in order to receive data from the PLMN ID.

In operation 419, the UE may receive the data from the PLMN.

According to the communication method of the UE, according to an embodiment of the disclosure, the SNPN AMF may be requested to request subscription to an external paging service from the PLMN, when the UE generates or modifies the PDU session in the SNPN, the PDU session being generated in order for the UE to access the PLMN.

Also, according to an embodiment of the disclosure, when the PDU session in the SNPN, the PDU session being generated by the UE to access the PLMN, is initially deactivated, that is, when the UE is initially transitioned to a CM-IDLE state in the PLMN, the SNPN AMF may request, through the SNPN NEF and the PLMN NEF, subscription to the external paging service from the PLMN AMF.

Also, according to an embodiment of the disclosure, when the UE using the PLMN service through the SNPN is in a CM-IDLE state in the PLMN and the PLMN receives DL data to be transmitted to the UE, the PLMN AMF may identify that the corresponding UE is subscribed to an external paging service and may transmit this information in the form of notification to the SNPN AMF through the PLMN NEF and the SNPN NEF.

Also, according to an embodiment of the disclosure, when the SNPN AMF transmits the paging message to the corresponding UE, and the UE performs the service request procedure to receive the DL data, the SNPN AMF may transmit the corresponding PLMN ID to the UE, to control the UE to perform the service request procedure through the PLMN and to receive the DL data.

The technical objectives to be achieved by the disclosure are not limited to the technical problems described above. Other technical objectives that are not mentioned may be clearly understood by one of ordinary skill in the art from the descriptions below.

According to embodiments of the disclosure, the UE may access the SNPN and receive an SNPN service, and at the same time, may access the PLMN through the SNPN and receive a PLMN service. Here, when the UE is transitioned to a CM-IDLE state in the PLMN, the UE could not receive paging from the PLMN, and thus, it was impossible to achieve seamless services. According to the present disclosure, this problem may be solved, such that the environment for the UE to receive the PLMN service through the SNPN may be improved.

Figure 5:
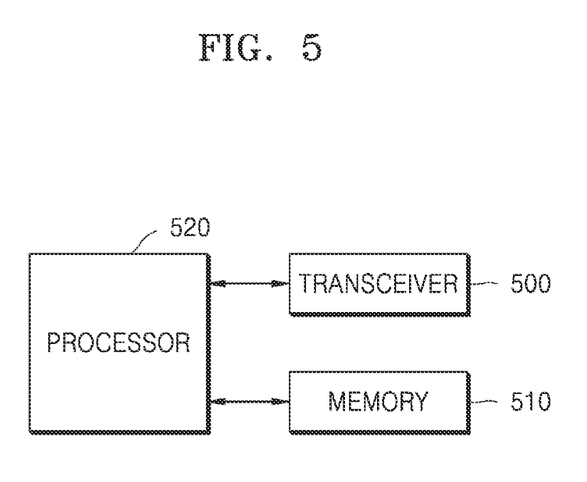
FIG. 5 illustrates components of a terminal according to an embodiment of the disclosure.

FIG. 5 is a diagram of components of a UE according to an embodiment of the disclosure.

The UE according to an embodiment of the disclosure may include a processor 520 configured to control general operations of the UE, a transceiver 500 including a transmitter and a receiver, and a memory 510. However, it is not limited to the example described above. The UE may include more or less components than the components illustrated in FIG. 5.

According to an embodiment of the disclosure, the transceiver 500 may transmit and receive signals to and from network entities or other UEs. The signals transmitted and received to and from the network entities may include control information and data. Also, the transceiver 500 may receive the signals through wireless channels and output the signals to the processor 520 and may transmit signals output from the processor 520 through the wireless channels.

According to an embodiment of the disclosure, the processor 520 may control the UE to perform any one operation in the embodiments described above. The processor 520, the memory 510, and the transceiver 500 may not necessarily have to be implemented as separate modules and may be implemented as one component, for example, as a single chip. Also, the processor 520 and the transceiver 500 may be electrically connected to each other. Also, the processor 520 may correspond to an application processor (AP), a communication processor (CP), a circuit, an application-specific circuit, or at least one processor.

According to an embodiment of the disclosure, the memory 510 may store data, such as basic programs for the operation of the UE, application programs, and configuration information. In particular, the memory 510 may provide the stored data in response to a request of the processor 520. The memory 510 may include a storage medium, such as read-only memory (ROM), random-access memory (RAM), a hard disk, a compact disk (CD)-ROM, or a digital versatile disk (DVD), or a combination of the storage media. Also, the memory 510 may include a plurality of memories. Also, the processor 520 may execute the embodiments of the disclosure described above based on the programs stored in the memory 510, the programs being configured to execute the embodiments of the disclosure described above.

Figure 6:
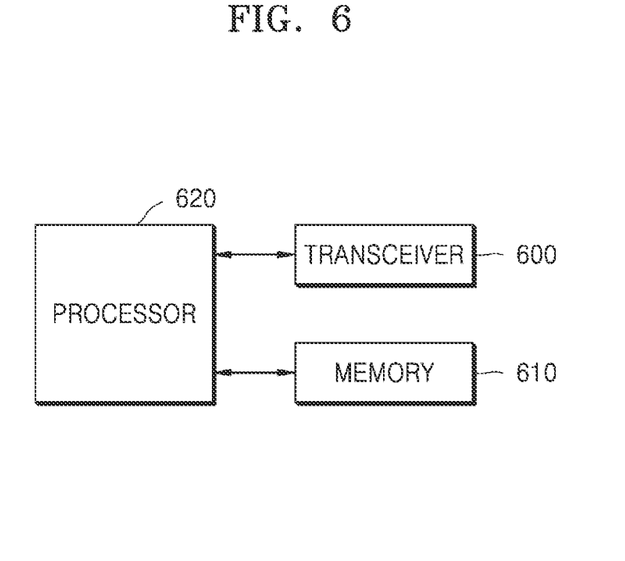
FIG. 6 illustrates components of a network entity according to an embodiment of the disclosure.

FIG. 6 is a diagram of components of a network entity according to an embodiment of the disclosure.

The network entity according to an embodiment of the disclosure may include a processor 920 configured to control general operations of the network entity, a transceiver 600 including a transmitter and a receiver, and a memory 610. However, it is not limited to the example described above. The network entity may include more or less components than the components illustrated in FIG. 6.

According to an embodiment of the disclosure, the transceiver 600 may transmit and receive signals to and from at least one of other network entities or the UE. The signals transmitted and received to and from the at least one of the other network entities or the UE may include control information and data.

According to an embodiment of the disclosure, the processor 620 may control the network entity to perform any one operation in the embodiments described above. The processor 620, the memory 610, and the transceiver 600 may not necessarily have to be implemented as separate modules and may be realized as one component, for example, as a single chip. Also, the processor 620 and the transceiver 600 may be electrically connected to each other. Also, the processor 620 may correspond to an AP, a CP, an application-specific circuit, or at least one processor.

According to an embodiment of the disclosure, the memory 610 may store data, such as basic programs for the operation of the network entity, application programs, and configuration information. In particular, the memory 610 may provide the stored data in response to a request of the processor 620. The memory 610 may include a storage medium, such as ROM, RAM, a hard disk, CD-ROM, a DVD, etc., or a combination of the storage media. Also, the memory 610 may include a plurality of memories. Also, the processor 620 may execute the embodiments of the disclosure described above based on the programs stored in the memory 610, the programs being configured to execute the embodiments of the disclosure described above.

It should be noted that the above-described diagrams, the example diagrams of the transmission method of control/data signals, the example diagrams of the operation procedure, and the diagrams are not intended to limit the scope of the claims of the present disclosure. That is, it shall not be interpreted that all components, entities, or operations described in the embodiments of the present disclosure are essential configurations for executing the disclosure, and the disclosure may be realized to an extent to which the essence of the disclosure is not deteriorated, by including only some of the configurations described above. Furthermore, the embodiments of the disclosure may be operated by being combined with one another if necessary. For example, portions of the methods provided by the disclosure may be combined with each other to enable the network entity and the UE to operate.

The operations of the base station or the terminal described above may be realized by including a memory device storing corresponding program codes as a component of the base station or the terminal device. That is, the base station or the controller of the terminal device may execute the operations described above, by reading and executing the program codes stored in the memory device by using the processor or a central processing unit (CPU).

The entities, various components of the base station or the terminal device, modules, etc. described in this specification may operate by using a hardware circuit, for example, a complementary metal-oxide semiconductor-based logic circuit; firmware and software; and/or a hardware circuit, such as a combination of hardware, firmware, and/or software inserted into a machine-readable medium. For example, various electrical structures and methods may be executed by using electrical circuits, such as transistors, logic gates, and an application specific integrated circuit.

When the electrical structures and methods are implemented in software, a computer-readable recording medium having one or more programs (software modules) recorded thereon may be provided. One or more programs stored in the computer-readable storage medium are configured to be executable by one or more processors in an electronic device. The one or more programs may include instructions for the electronic device to execute the methods according to the embodiments of the disclosure described in the claims and the specification.

The programs (software modules or software) may be stored in non-volatile memories including RAM, flash memory, etc., ROM, electrically erasable programmable ROM (EEPROM), a magnetic disc storage device, CD-ROM, DVDs other optical storage devices, or magnetic cassettes. Alternatively, the programs may be stored in a memory composed of part or all of the memories described above. Also, each of the memories included in the memory may be provided in a multiple number.

Also, the programs may be stored in an attachable storage device that is accessible through a communication network such as Internet, intranet, local area network (LAN), wide LAN (WLAN), or storage area network (SAN), or communication network provided by a combination thereof. The storage device may access a device configured to perform the embodiment of the disclosure through an external port. Furthermore, a separate storage device on the communication network may access the electronic device performing the embodiments of the disclosure.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

Although specific embodiments have been described in the detailed description of the present disclosure, various modifications may be made without departing from the scope of the present disclosure. Therefore, the scope of the disclosure should not be limited to the above-described embodiments of the disclosure and should be determined by the appended claims and the equivalents thereof. That is, it will be understood by one of ordinary skill in the art that various changes in form and details may be made based on the technical concept of the disclosure. Also, the embodiments may be combined to be implemented, when required. For example, portions of the methods provided by the disclosure may be combined with each other to enable the BS and the UE to operate. Also, although the aforementioned embodiments of the disclosure are proposed based on a 5G or NR system, modifications to the embodiments of the disclosure, which do not deviate from the scope of the disclosure, may be applicable to other systems such as an LTE, LTE-A, or LTE-A-Pro system, etc.

Although specific embodiments have been described in the detailed description of the present disclosure, various modifications may be made without departing from the scope of the present disclosure. Thus, it will be apparent to one of ordinary skill in the art that the scope of the disclosure is not limited to the embodiments described herein and should be defined by the appended claims and their equivalents.

The invention claimed is:

1. A communication method performed by a user equipment (UE) to receive a paging message, the communication method comprising:
 registering to a stand-alone non-public network (SNPN);
 transmitting, to a session management function (SMF) of the SNPN or an access and mobility management function (AMF) of the SNPN, a protocol data unit (PDU) session establishment request message for requesting subscription to a notification service for receiving a paging message of a public land mobile network (PLMN);
 registering to the PLMN through the SNPN and a non-3GPP inter-working function (N3IWF) of the PLMN;
 in a case where a paging event occurs when the UE is in an idle state in the PLMN, receiving the paging message from the AMF of the SNPN having received a notification message based on the notification service; and
 performing a service request procedure based on the paging message.

2. The communication method of claim 1, wherein the performing of the service request procedure includes receiving a service accept message including an identification (ID) of the PLMN.

3. The communication method of claim 1, wherein the PDU session establishment request message includes an identification (ID) of the PLMN, to which the UE is to register, and a generic public subscription identifier (GPSI) assigned from the PLMN.

4. The communication method of claim 1, further comprising, through a PDU session modification procedure, requesting subscription to the notification service from the SMF of the SNPN or the AMF of the SNPN.

5. The communication method of claim 1, wherein the notification service for receiving the paging message includes a paging event notification service or a downlink notification (DN) event notification service.

6. A communication method performed by an entity in a stand-alone non-public network (SNPN) to receive a paging message, the communication method comprising:
 receiving, from a user equipment (UE), a protocol data unit (PDU) session establishment request message for requesting subscription to a notification service for receiving a paging message of a public land mobile network (PLMN);
 subscribing to the notification service for receiving the paging message of an access and mobility management function (AMF) of the PLMN, when the UE is in an idle state in the PLMN;
 receiving, from the AMF of the PLMN, a notification message based on the notification service, through a network exposure function (NEF) of the PLMN;
 transmitting, to the UE, the paging message, based on the notification message; and
 performing a service request procedure with the UE.

7. The communication method of claim 6, wherein the performing of the service request procedure includes transmitting a service accept message including an identification (ID) of the PLMN.

8. The communication method of claim 6, wherein the PDU session establishment request message includes an identification (ID) of the PLMN, to which the UE is to register, and a generic public subscription identifier (GPSI) assigned from the PLMN.

9. The communication method of claim 6, wherein the subscribing to the notification service for receiving the paging message of the AMF of the PLMN, when the UE is in the idle state in the PLMN, includes subscribing to the notification service for receiving the paging message of the AMF of the PLMN, through an NEF of the SNPN and the NEF of the PLMN, or subscribing to the notification service for receiving the paging message of the AMF of the PLMN, through the NEF of the SNPN, an application function (AF) of the SNPN, and the NEF of the PLMN.

10. The communication method of claim 6,
 wherein the entity is an AMF of the SNPN or a session management function (SMF) of the SNPN, and
 wherein the notification service for receiving the paging message includes a paging event notification service or a downlink notification (DN) event notification service.

11. A user equipment (UE) configured to receive a paging message, the UE comprising:
 a transceiver and a processor coupled to the transceiver and configured to:
  register to a stand-alone non-public network (SNPN),
  transmit, to a session management function (SMF) of the SNPN or an access and mobility management function (AMF) of the SNPN, a protocol data unit (PDU) session establishment request message for requesting subscription to a notification service for receiving a paging message of a public land mobile network (PLMN),
  register to the PLMN through the SNPN and a non-3 GPP inter-working function (N3IWF) of the PLMN,
  in a case where a paging event occurs when the UE is in an idle state in the PLMN, receive the paging message from the AMF of the SNPN having received a notification message based on the notification service, and perform a service request procedure based on the paging message.

12. The UE of claim 11, wherein the processor is further configured to receive a service accept message including an identification (ID) of the PLMN.

13. The UE of claim 11, wherein the PDU session establishment request message includes an identification (ID) of the PLMN, to which the UE is to register, and a generic public subscription identifier (GPSI) assigned from the PLMN.

14. The UE of claim 11, wherein the processor is further configured to request, through a PDU session modification procedure, the SMF of the SNPN or the AMF of the SNPN to subscribe to the notification service.

15. An entity in a stand-alone non-public network (SNPN), the entity being configured to receive a paging message, the entity comprising:
a transceiver and a processor coupled to the transceiver and configured to:
receive, from a user equipment (UE), a protocol data unit (PDU) session establishment request message for requesting subscription to a notification service for receiving a paging message of a public land mobile network (PLMN),
register to the notification service for receiving the paging message of an access and mobility management function (AMF) of the PLMN, when the UE is in an idle state in the PLMN,
receive, from the AMF of the PLMN, a notification message based on the notification service, through a network exposure function (NEF) of the PLMN,
transmit, to the UE, the paging message based on the notification message, and
perform a service request procedure with the UE.

* * * * *